Feb. 5, 1952 — L. C. HARP, SR — 2,584,202
RAW MILK AERATOR
Filed March 4, 1950 — 2 SHEETS—SHEET 1
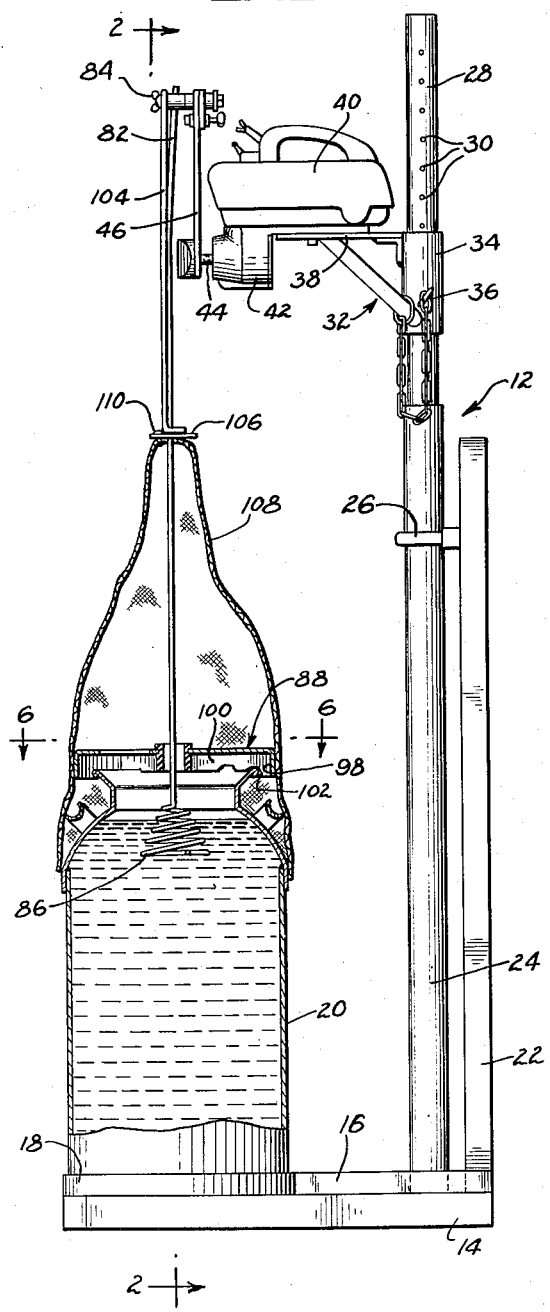
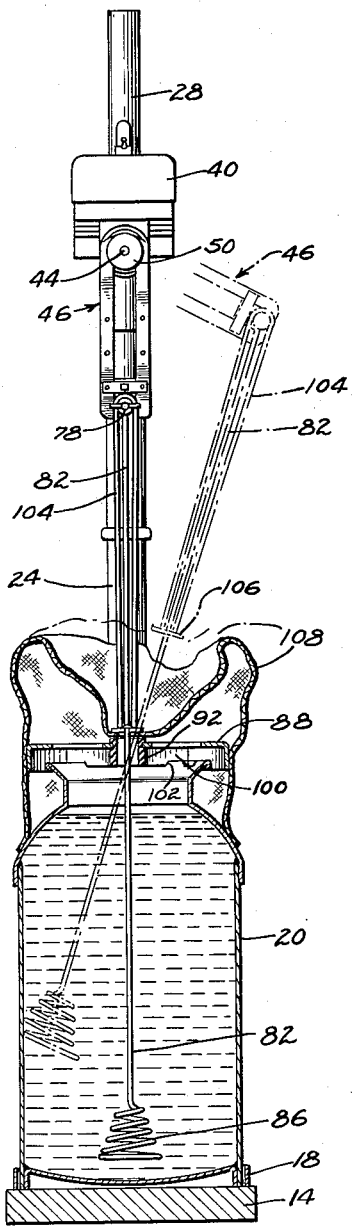
INVENTOR.
Lloyd C. Harp, Sr.

Feb. 5, 1952  L. C. HARP, SR  2,584,202
RAW MILK AERATOR
Filed March 4, 1950  2 SHEETS—SHEET 2
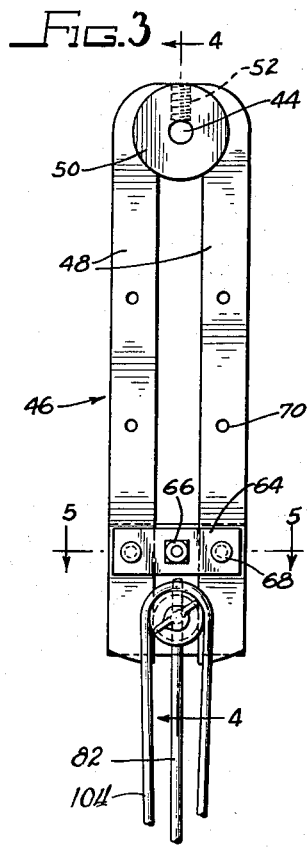
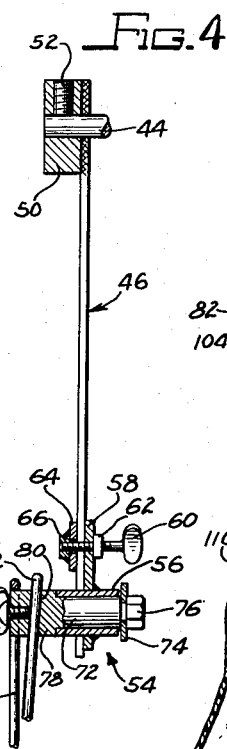
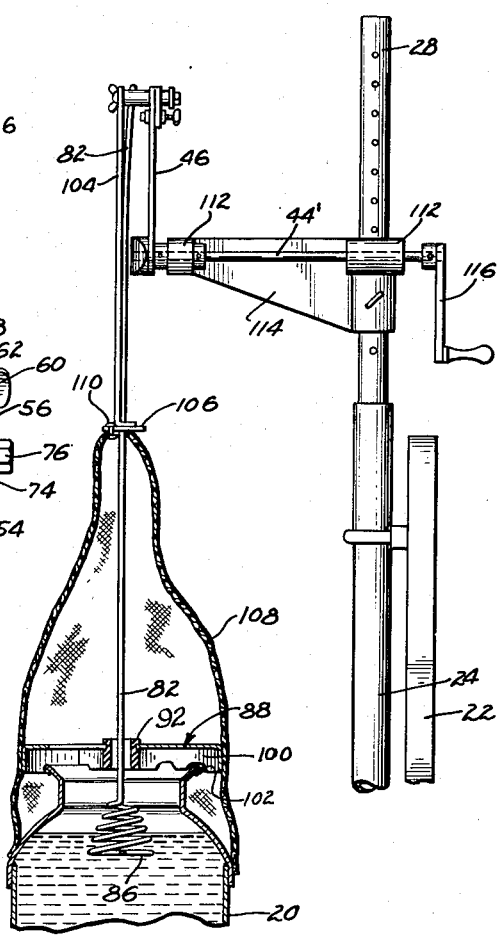
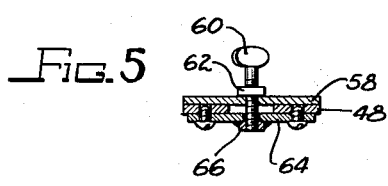
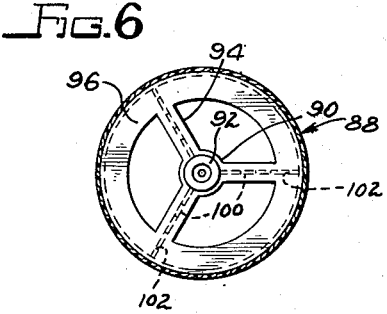
INVENTOR.
Lloyd C. Harp, Sr.
BY Bair, Freeman & Molinare
Attys.

Patented Feb. 5, 1952

2,584,202

UNITED STATES PATENT OFFICE 2,584,202

RAW MILK AERATOR

Lloyd C. Harp, Sr., Waterloo, Iowa

Application March 4, 1950, Serial No. 147,679

6 Claims. (Cl. 259—113)

This invention relates to a device for aerating raw milk for the purpose of removing animal heat and odors.

When milk is not aerated, it tends to sour quickly but if it is aerated, it remains sweet for a greater length of time. It is important that the milk be aerated as soon as possible after the cows are milked so that the chances of the milk souring are reduced to a minimum.

The present invention includes a device specially adapted for home use, that is, it is used by the individual producer and the milk can be aerated immediately after the cows are milked.

An object of the present invention is the provision of a simple and efficient device which can be employed for aerating milk that is contained in standard milk cans that are employed for shipping milk to and from the dairy.

Another object is the provision of a simple and efficient device for aerating milk wherein there are a minimum number of parts that require cleaning.

A still further object is the provision of a novel construction aerator that can be employed for aerating milk in a standard milk can in the use of which dust and dirt is prevented from falling into the milk.

A further object is the provision of a device which is effective for aerating and cooling milk in milk cans without the necessity of placing the milk cans in cooling water, but it is also such that it can be employed when the milk cans are placed in water, if such is desired.

A still further object is the provision of an efficient device which is effective for producing directional circulation of air over the milk as the milk is agitated for aerating and cooling the milk.

Another object is the provision of a simple device of the character above referred to which can be readily adapted to power operation or hand operation.

With these and other objects in view, my invention consists in the construction, arrangement, and combination of the various parts of my device whereby the objects contemplated are attained, as hereinafter more fully set forth, pointed out in the claims, and illustrated in the accompanying drawings, wherein:

Figure 1 is a side elevational view of the device of the present invention;

Figure 2 is a view from the left of Figure 1;

Figure 3 is an enlarged detail view of the arm for operating the agitator and air circulating hood;

Figure 4 is a sectional view taken on line 4—4 of Figure 3;

Figure 5 is a sectional view taken on line 5—5 of Figure 3;

Figure 6 is a plan view of the guide for placing on top of the milk can; and

Figure 7 shows the upper portion of an aerator device adapted for hand operation.

Referring in detail to the drawings, the device includes a stand indicated generally at 12, mounted on a base 14. The stand 12 includes a bottom horizontal foot portion 16 that is mounted directly on the base 14 by any convenient securing means, the base being of appropriate dimensions for retaining the stand and all of the appurtenances thereon in upright position. One end of the foot portion 16 is in the shape of a ring indicated at 18, the ring being adapted for the insertion of a milk can 20 which then rests directly on the base 14, the ring 18 retaining the milk can in proper position. The milk can 20 will be recognized as a conventional or standard milk can commonly employed for transporting milk to and from dairies.

At the end of the foot portion 16 opposite the ring 18 is secured an upright standard 22 which is mounted in the foot portion by any convenient securing means. An upright tubular member 24 is also secured in the foot portion 16 adjacent the standard 22 and retained in upright position by a bracket 26 fitted over the tubular portion 24 and mounted on the standard 22. An insert member 28 is telescopically fitted in the tubular portion 24 and may be either fixed or adjustable vertically as desired. The insert 28 is provided with a plurality of holes 30.

A bracket 32 is mounted on the insert 28 and includes a tubular portion 34 telescoped over the insert 28 and the bracket is accordingly slidable vertically thereon. A pin 36 is inserted through holes in the tubular element 34 and projects through one of the holes 30 for supporting the bracket 32 in the desired position of adjustment on the insert 28. The bracket 32 is also provided with a horizontal portion or platform 38 supporting an electric motor 40 which may be a conventional motor provided with a speed reducer 42 having an operating shaft 44.

The numeral 46 indicates an operating arm mounted on the shaft 44 for actuating the milk agitator and the air circulating hood. The arm 46 may be of any desired construction for the purpose intended but one specific kind of construction is illustrated in Figures 3, 4 and 5. The arm 46 is made up of a pair of laterally spaced arm elements 48 welded or otherwise mounted on a hub 50. The hub 50 has a central hole for receiving the shaft 44 and a set screw 52 is threaded through a tapped hole in the hub, the screw engaging the shaft 44 for rigidly mounting the arm on the shaft for rotation therewith.

At the swinging end of the arm 46 is a bearing and mounting assembly indicated generally at 54 which includes a sleeve 56 fitted in a hole in a plate 58 and welded therein. The plate 58 is fitted against one of the flat sides of the arm 46 with the sleeve 56 positioned between the ends of the arm elements 48. A thumb screw 60 provided with a lock nut 62 is loosely inserted through a hole in the plate 58, through a hole in a cross piece 64 on the opposite side of the arm 46, and threaded into the nut 66 which is welded to the cross piece 64. The cross piece 64 is provided with pins 68 adapted to be fitted in any one of the several pairs of holes 70 in the arm elements. By loosening the thumb screw 60 the cross piece 64 can be removed, withdrawing the pins from the holes which can then be inserted in any of the other pairs of holes 70; the plate 58 is adjusted in alignment therewith and the thumb screw 60 is reinserted into the nut 66 and threaded thereinto. The result is positioning the bearing and mounting assembly 54 in any of several different distances from the axis of the operating shaft 44 for the purpose of lengthening or shortening the effective length of the operating arm 46.

The assembly 54 also includes a shaft 72 mounted in the sleeve 56 and secured therein by means of a washer 74 and screw 76 fitted against one end of the sleeve 56. The other end of the sleeve 56 is engaged by the shoulder formed by an enlarged portion 78 of the shaft 72.

The shaft 72 and particularly the enlarged portion 78 thereof is provided with a hole 80 in which is inserted the upper end of an agitator rod 82. The enlargement 78 is provided with a tapped opening in which is threaded a wing screw 84 engaging the rod 82 and retaining the latter in the hole 80.

As will be observed (Figure 1) the rod 82 extends down into the milk can 20 and at the lower end of the rod 82 is an agitator cone 86 which is in the form of a wire coil or spiral.

The numeral 88 indicates an agitator guide which is in the form of a spider illustrated most clearly in Figure 6. The guide 88 includes a central portion 90 having an aperture therethrough in which is inserted a ferrule 92 that may be of rubber or other desired material. The guide 88 also includes radial arms 94 which interconnect the central hub 90 and the outer annular ring 96 which has a downturned flange 98 (Figure 1). The radial arms 94 have vertical webs or ribs 100 in which are cut several radially spaced notches 102. The guide 88 is placed on top of the milk can 20 with certain of the notches 102 fitted over the upper edge of the milk can. The ribs 100 are provided with the several notches to accommodate milk cans of different sizes.

The agitator rod 82 extends through the ferrule 92 and it will be understood that the parts are fitted together by removing the rod 82 from the shaft 72 and inserting the upper end of the rod through the ferrule. The rod is made removable from the shaft 72 for that purpose and also for the purpose of enabling ready cleaning of the agitator cone 86 as well as the rod.

Another rod 104 is mounted on the shaft 72.

The rod 104 is preferably made up of a pair of rod elements doubled together forming a loop which is fitted over the enlargement 78 and welded thereto. The rod 104 is of considerably lesser length than the rod 82 and at the lower end of the rod 104 is an adaptor having notches in opposite sides. The rod 82 is adapted to be fitted in one of the notches.

A hood is indicated at 108 and is preferably of cloth fabric or similar flexible material. The upper end of the hood 108 is substantially closed and provided with a button 110 fitted in the other of the notches in the adaptor 106 thereby supporting the hood 108 by the adaptor 106. The upper end of the hood 108 is provided with a small opening for the insertion of the agitator rod 82.

The arrangement of elements is such that when the button 110 is supported by the adaptor 106, the hood 108 fits down over the upper end of the milk can.

Brief reference is made to Figure 7 which illustrates a hand operated device. The whole device is essentially the same as that previously described except that instead of an electric motor for operating the device, a crank is provided. In Figure 7 the operating shaft 44' corresponds to the shaft 44 of Figure 1. The shaft 44' is mounted in bearings 112 on a bracket 114 which is mounted on the insert 28 in the manner described in connection with the bracket 32. The shaft 44' is provided with a crank 116.

*Operation*

With the various parts assembled and arranged as illustrated in Figure 1, the motor 40 is turned on. The shaft 44 rotates, swinging the arm 46 which reciprocates both of the rods 82 and 104 vertically. As the arm 46 swings downwardly, the agitator cone 86 also is lowered to the position shown in Figure 2 and on continued rotation of the arm 46 the agitator thoroughly disturbs and agitates the milk in the can 20. The guide 88 establishes a pivot point for the agitator rod 82 and upon the upper end of the rod 82 following a rotary motion, the agitator cone 86 likewise follows a rotary motion with consequent thorough agitation of the milk.

At the same time that the agitator is actuated, the arm 46 causes reciprocation of the rod 104, which causes the hood 108 to be raised and lowered. The guide 88 spaces the hood from the sides of the can and permits air to pass through the spaces formed by the guide 88 into and out of the interior of the hood. The hood 88 is alternately collapsed and extended which forces air into and out of the milk can also causes the air to be exhausted out of the hood to the exterior and draws in new air. The air thus being forced into and out of the can, aerates the milk and enables all of the milk to be subjected to the aerating process in a short time. The air is forcibly circulated and caused to flow over the milk.

The hood 108 prevents the entrance of dirt and dust into the milk can and for that reason it will be seen that the device is sanitary.

The device can be employed for the different sized milk cans. The notches 102 accommodate different diameters of the milk can and different heights of milk cans are accommodated by raising or lowering of the bracket 82 on the insert 28 of the stand. The supporting ring 18 is effective for properly securing milk cans of different diameters in the desired position.

The milk in the milk can need not be exposed at any time. In positioning the milk can for the aerating process, the lower end of the hood 108 can be placed over the milk can before the lid thereof is removed. The user can reach up under the hood and remove the cover and thereafter insert the agitator cone 86 into the can and place the guide 88 thereon.

For cleaning the device the agitator rod 82 can be quickly removed from the shaft 72 and the hood 108 can be quickly detached from the adaptor 106. Then the three elements, namely, agitator and rod, the hood, and the guide 88 can be readily and quickly cleaned. None of the other parts become soiled nor do they need cleansing for the aerating and cooling process.

The agitation and aeration of the milk as above described are effective for cooling the milk in the milk can without the necessity of placing the milk can in water for that purpose. However, the device is such that if it should be desired to place the milk can in water for quickly cooling the milk, such can be done.

It is obvious that the operation of the device of Figure 7 is as above described. Instead of the shaft 44 of Figure 1 being operated by a motor, the shaft 44' of Figure 7 is actuated manually by manipulation of the crank 116.

While I have herein shown and described certain preferred embodiments of my invention, manifestly they are susceptible of modification and rearrangement of the parts without departing from the spirit and scope thereof. I do not therefore wish to be understood as limiting my invention to the precise forms herein disclosed, except as I may be so limited by the appended claims.

I claim:

1. In a device of the character disclosed, a stand adapted for use with a receptacle, a rotatable shaft mounted on said stand, an arm on said shaft, a guide means adapted to rest on the receptacle, said guide means having a central hub with an aperture therethrough and a plurality of radial blades, said blades being angularly disposed relative to the plane of the guide means, said guide means having a perimeter element secured to the outer ends of said blades, said blades being engageable with the receptacle and the perimeter member being disposed outwardly of the perimeter of the receptacle, an agitator secured to the free end of said arm and extending through and slidable in the aperture in said guide means, a hood secured to the free end of said arm, said hood being adapted to be fitted over the receptacle, the end of the agitator in the receptacle following a generally circular motion in response to movement of the other end by the free end of said arm, said hood being raised and lowered in response to movement of the free end of said arm, and said guide means spacing said hood from the sides of the receptacle.

2. A machine for agitating and aerating fluids which are contained in a receptacle having an open mouth at the top thereof, said agitating and aerating machine comprising an agitating member, a guide member adapted to be mounted over the open mouth of said receptacle, said guide member having a central aperture through which said agitating member extends into said receptacle, said guide member forming a plurality of venting apertures through which air may pass during the aeration of the fluid in the receptacle, the outer edge of said guide member being spaced laterally outside the mouth of said receptacle, a hood fitting over the outer edge of said guide, and means for reciprocating said agitating member and hood, whereby the agitating member agitates the fluid in said receptacle and the hood forces air into and out of said receptacle, said outer edge of the guide serving to space the hood from the mouth of the receptacle.

3. A machine as set forth in claim 2 wherein a portion of said hood is fixed with respect to said agitating member, whereby the agitating member and hood are reciprocated in unison.

4. A machine as set forth in claim 2 wherein said guide member has notches therein cooperating with the edge of the mouth of the receptacle to maintain said guide member in position on said receptacle.

5. A machine as set forth in claim 2 wherein said hood extends below said guide member and is adapted to engage the outer walls of said receptacle.

6. A machine for agitating and aerating fluids which are contained in a receptacle having an open mouth at the top thereof, said agitating and aerating machine comprising an agitating member adapted to be inserted into the open mouth of the receptacle, a guide member adapted to be positioned over the open mouth of said receptacle, said guide member having a central aperture therethrough and a perimeter portion disposed outwardly of the open mouth of said receptacle, said agitating member adapted to pass through said central aperture into said receptacle, a hood fitted over said guide member and having a portion thereof fixed with respect to said agitating member, and means for reciprocating and oscillating said agitating member and said hood, said perimeter portion of the guide member spacing said hood from the mouth of the receptacle.

LLOYD C. HARP, Sr.

REFERENCES CITED

The following references are of record in the file of this patent:

UNITED STATES PATENTS

| Number | Name | Date |
|---|---|---|
| 408,126 | Mitchum | July 30, 1889 |
| 519,746 | Thomas | May 15, 1894 |
| 628,474 | Kingsbury | July 11, 1899 |
| 646,430 | Hargrove | Apr. 3, 1900 |
| 691,223 | Whitely | Jan. 14, 1902 |
| 1,161,416 | Schrock | Nov. 23, 1915 |
| 1,523,027 | Lindberg | Jan. 13, 1925 |
| 1,841,756 | Motsinger | Jan. 19, 1932 |